United States Patent [19]

Hewlett et al.

[11] Patent Number: 5,508,750

[45] Date of Patent: Apr. 16, 1996

[54] ENCODING DATA CONVERTED FROM FILM FORMAT FOR PROGRESSIVE DISPLAY

[75] Inventors: Gregory J. Hewlett, Garland, Tex.; Robert J. Gove, Los Gatos, Calif.

[73] Assignee: Texas Instruments Incorporated, Dallas, Tex.

[21] Appl. No.: 383,349

[22] Filed: Feb. 3, 1995

[51] Int. Cl.$^6$ .................................................. H04N 7/01
[52] U.S. Cl. ........................................ 348/558; 348/700
[58] Field of Search ................................... 348/558, 700, 348/722, 441, 911, 449, 553; H04N 7/01, 7/18

[56] References Cited

U.S. PATENT DOCUMENTS

| | | | |
|---|---|---|---|
| 4,982,280 | 1/1991 | Lyon et al. | 348/558 |
| 5,099,322 | 3/1992 | Gove | 358/105 |
| 5,317,398 | 5/1994 | Casavant et al. | 348/700 |
| 5,406,333 | 4/1995 | Martin | 348/558 |
| 5,457,495 | 10/1995 | Lim | 348/558 |
| 5,459,517 | 12/1995 | Kanitake et al. | 348/700 |

OTHER PUBLICATIONS

Didier Le Gall, *MPEG: A Video Compression Standard for Multimedia Applications*, Communications of the ACM, Apr. 1991, vol. 34, No. 4, 47–58.

Chad Fogg, *MPEG–2 Technical Frequently Asked Questions (FAQ)*, May 10, 1994, 1–24.

Primary Examiner—Victor R. Kostak
Attorney, Agent, or Firm—Julie L. Reed; James C. Kesterson; Richard L. Donaldson

[57] ABSTRACT

A method of encoding video display data, after that data has been previously converted from a film frame rate to a faster video frame rate, such as by 3:2 pulldown. The data is first re-converted to the film frame format, as progressive frames (21). This progressive frame data is processed to determine where scene cuts occur (22). The data is then encoded consistent with MPEG encoding techniques, but with the scene cut information being used to begin groups of pictures (GOPs) at scene cuts and to determine where intrapictures, predicted pictures, or interpolated pictures shall occur (23).

20 Claims, 2 Drawing Sheets

ENCODING DATA CONVERTED FROM FILM FORMAT FOR PROGRESSIVE DISPLAY

TECHNICAL FIELD OF THE INVENTION

This invention relates to image data processing, and more particularly to encoding data converted from film format, for a system that display progressively scanned frames of data, such as a spatial light modulator.

BACKGROUND OF THE INVENTION

It is often desired to display a movie originally recorded on film by means of a television broadcast. In order to comply with television broadcast field rates, some sort of film-to-video conversion must be performed.

Typically, a movie is recorded and displayed at a frame rate of 24 frames per second. However, television broadcasts use a different rate, such as the 59.94 field per second rate of the NTSC standard where every two fields are interlaced and comprise one frame.

One method of converting film frame rates to television field rates is referred to as the "3:2 pulldown" scanning method. A first film frame is scanned three times, then a second film frame is scanned twice, the next frame three times, etc. Every six film frames take the same time as fifteen fields of the television signal. To accommodate the fact that the NTSC vertical scan period is slightly less than 60 fields per second, fields may be dropped to match the actual rate of the receiver.

Film to video conversion is now being combined with techniques for digitizing the video data. These techniques include digital compression techniques for providing less bandwidth (bits per second). One compression technique is embodied in a standard known as "MPEG", named for the Moving Picture Experts Group that began the effort to provide a standard. The MPEG standard attempts to strike a balance between the high compression associated with interframe coding and the random access capability associated with intraframe coding. To answer this challenge, the MPEG standard uses two interframe coding techniques, predictive and interpolative, and an intracoded technique. For coding video data, the MPEG encoding techniques are used to encode MPEG "pictures" from fields or frames of video data.

SUMMARY OF THE INVENTION

One aspect of the invention is a method of processing and encoding video display data, after that data has been previously converted from a film frame rate to a faster video frame rate. A typical application of the method is for encoding data that has previously been converted from 24 frame per second film format to 30 frame per second video format. The data is first reconverted to the slower film frame rate, thereby obtaining progressive frame data. Then a scene cut detection process is applied to the progressive frame data to determine where scene cuts occur. The progressive frame data is then encoded consistent with MPEG encoding, but such that each scene cut begins a new group-of-pictures (GOP) and each new GOP has an intrapicture as the first picture. Also, the last picture of each GOP is either an intrapicture or a predicted picture. Intervening pictures can include intrapictures, predicted pictures, and interpolated pictures.

A technical advantage of the invention is that greatly improved picture quality of MPEG encoded data derived from film. Because the data is a 24 frames per second, rather than 30 frames per second, more bits are used per frame. Also, the method eliminates wasted bits due to high frequencies in frames with time-separated fields. Finally, scene division prevents spanning of scene cuts of GOPs, which results in meaningless motion vectors.

DETAILED DESCRIPTION OF THE INVENTION

Figure 1:
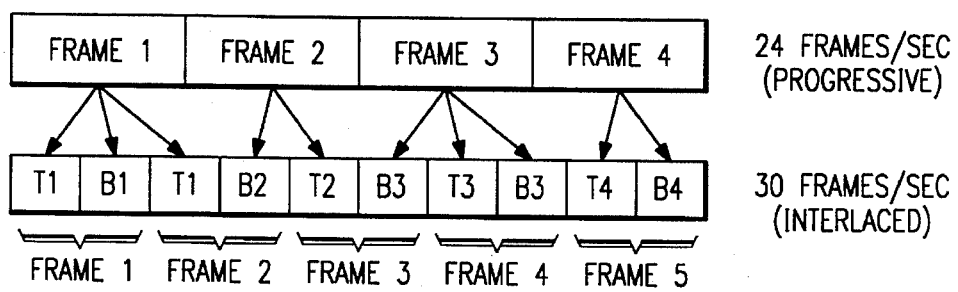
FIG. 1 illustrates a segment of a movie film being scanned for broadcast as an NTSC television signal, to create 3:2 pulldown data.

FIG. 1 illustrates a segment of movie film being scanned for broadcast as an NTSC television signal. As indicated, the film displays 24 frames per second. Frame 1 has been scanned three times to make three fields of the television signal. Frame 2 has been scanned twice, Frame 3 three times, etc. The result is a television signal having 60 interlaced fields per second (30 frames per second), which approximates the 59.94 field per second rate of the standard NTSC format. This process is referred to as "3:2 pulldown scanning".

Although the above description is in terms of 3:2 pulldown scanning to an NTSC television signal, the same concepts apply to scanning movie films to other television formats. For example, for a PAL broadcast of 50 fields per second, a film-to-video ratio of 2 television fields per movie frame might be used. For this reason, the 3:2 pulldown format is referred to generally herein as a "film-to-video format", characterized by the fact that source image frames are scanned in a periodic sequence that results in a desired field-to-frame ratio.

In the 3:2 example of this description, the desired field-to-frame ratio is:

$$60/24=5/2.$$

For integer frame numbers, this is equivalent to five video fields for every two film frames, with the best symmetry being accomplished with 3:2 pulldown scanning.

The 24 frame per second film is progressive in the sense that each frame contains the entire number of lines for one picture. However, the 60 field per second video is interlaced. Half of each movie frame (the top or the bottom lines) is used for each video field. For purposes of this description, the "top" field is the field containing the first line and every alternating line of a frame, whereas the "bottom" field is the field containing the second line and every alternating line. This eliminates confusion with respect to whether line numbering begins at 0 or begins at 1. Assuming that the first line was line 0, the top field would be the even field.

In FIG. 1, for CRT-based display systems, the top fields (T1 ... T4) are interlaced with the bottom fields (B1 ... B4) when the data is scanned to the CRT screen. However, a recent development in image display systems are non-CRT display systems that use progressive frames rather than interlaced fields. One type of progressive display system is a spatial light modulator (SLM)-based system. A specific example of such an SLM is a digital micro-mirror device (DMD). DMD-based display systems are described in the several patents and patent applications, each assigned to Texas Instruments, and each incorporated by reference herein. These include U.S. Pat. No. 5,079,544, entitled "Standard Independent Digitized Video System", U.S. Pat. No. 08/147,249, entitled "Digital Television System", and U.S. Pat. No. 08/146,385, entitled "DMD Display System".

A feature of the invention is the recognition that video that has undergone 3:2 pulldown conversion can undergo an enhanced MPEG encoding process to improve picture quality. In FIG. 1, frames 1, 4, and 5 of the video signal contain data from the same movie frame. However, frames 2 and 3 contain data from time-separated movie frames. If a scene cut were to occur in either frame 2 or 3, the two fields in that frame would be entirely unrelated. The predictive coding of an MPEG-based encoding method would be frustrated. Upon decoding and display, the picture quality would not reflect the image quality that MPEG attempts to achieve.

Figure 2:
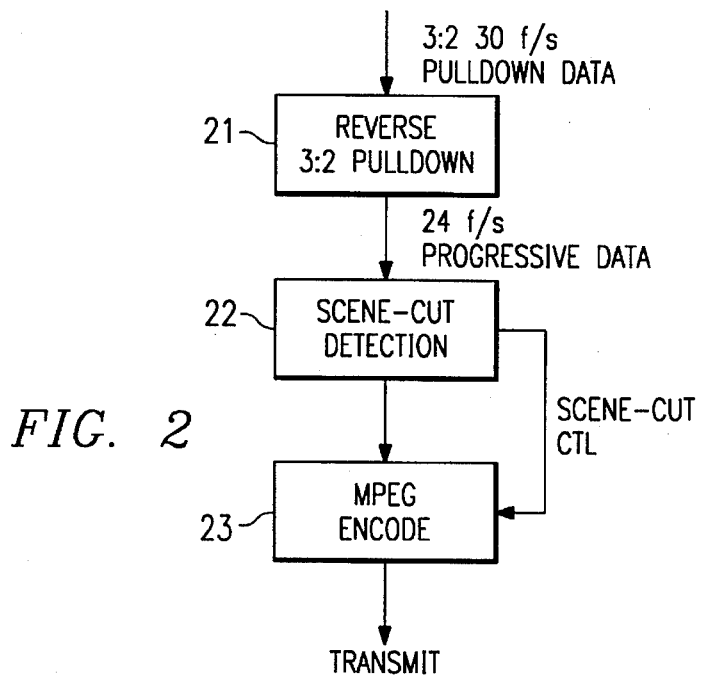
FIG. 2 illustrates a method of processing 3:2 pulldown data for MPEG encoding.

FIG. 2 illustrates a process of encoding video data in accordance with the invention. The method is especially useful for encoding data for eventual decoding and display by a display system, such as a DMD-based system, that is capable of displaying progressive frames at 24 frames per second. However, the method could be used for any display system, with appropriate scan rate conversion of the data prior to display.

For purposes of this description, it is assumed that the input data is data that represents images originally produced on film at 24 frames per second. This input data has been converted to 30 frame per second format by means of 3:2 pulldown. If this data does not match the desired resolution or aspect ratio requirements, appropriate downscaling or upscaling may be performed.

In step 21, the data is converted from its 30 frame per second interlaced format to its original 24 frame per second progressive format. This is accomplished by determining, for each frame, whether the two fields of the frame are from time-separated movie frames. By identifying where top and bottom fields are repeated, the data can be converted from 30 frame per second video format to 24 frame per second progressive format.

Figure 3:
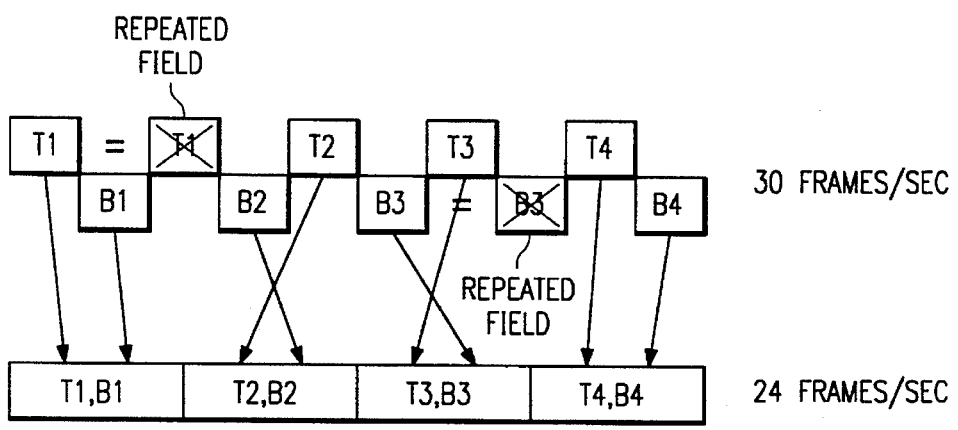
FIG. 3 illustrates a reverse 3:2 pulldown conversion in accordance with step 21 of FIG. 2.

FIG. 3 illustrates a "reverse 3:2 pulldown in accordance with step 21. Fields T1 and B1 are from the same movie frame. Field T1 is repeated and is not used a second time. Fields T2 and B2 are from a second movie frame. In this manner, the two fields that belong to the same frame of the 24 frame per second format are identified. These fields are then put together to form progressive frames.

In general, to identify the fields with the correct frames, the 3:2 pattern is identified by a field differencing process. The pixel values between successive B fields and successive T fields are compared. A high difference value indicates a change between fields. Where "1" indicates a high difference value above a specified threshold, the 3:2 pattern will be 0,1,1,1,0,1,1,1,0 . . . when there is motion. Once this pattern is identified, the fields associated with "0" field difference values are considered repeated fields. The two pairs of intervening fields belong to two movie frames.

U.S. Pat. No. 08/145,934, entitled "Film-to-Video Format Detection for Digital Television", describes further details of how a pattern of data that has been converted to 3:2 format can be detected. Each field can be associated with a position in the 3:2 pattern. The same techniques can be applied to the present invention to determine which fields are from the same frame. That patent application is assigned to Texas Instruments Incorporated and is incorporated herein by reference.

Referring again to FIG. 2, in step 22 of the encoding method of the invention, the data is now 24 frame per second progressive frame data. A scene cut detection process is applied to this data. This determines the best place for the beginning of each group-of-pictures (GOP).

In general, scene cut detection relies on detecting change in a sequence of frames. As in the case of motion detection, a pixel-to-pixel difference of two successive frames followed by a threshold operation yields a scene difference value. A large difference indicates that the scene has changed. Then, it must be determined whether the change is due to a scene cut or to other factors, such as motion within the image, camera panning, or a change in illumination.

In a first method of scene cut detection, a series of frame difference values are obtained. These are then analyzed over time, on the premise that motion will result in a relatively constant series of frame difference values, whereas a scene change will result in a single abrupt frame difference value.

In another method of scene cut detection, pixel values of each frame are transformed into frequency domain values. The frame difference values are then obtained and analyzed over time. As in the spatial domain method, motion will result in a relatively constant values over time. Frequency domain values, especially those values corresponding to low frequencies, will be less affected by motion than spatial domain values. Thus, the margin between frames with motion and frames with a scene cut is greater, and false scene cut detection is less likely. In a simple frequency domain method, a pixel average for each entire frame might be obtained, and the low frequency values compared from frame to frame.

Various scene cut detection methods are described in U.S. Pat. No. 5,099,322 to Gove, entitled "Scene Change Detection System and Method", assigned to Texas Instruments Incorporated and incorporated by reference herein. These methods suitable for use in the present invention.

The various scene-cut detection methods will correctly parse the data in most cases. In the case of camera panning, a high frame difference that is not a scene cut might exist. To distinguish panning scenes from scene cuts, a high pass filter may be used to eliminate as scene cuts, long runs of high variations. Another type of false identification of a scene cut might occur in the case of an explosion. However, such false identifications can be included as scene cuts without detriment to picture quality.

In step 23, the data is compressed, with a scene-cut control signal from step 22 being used to determine the encoding. The encoding step is consistent with MPEG standards, using groups of pictures (GOPs) with intrapictures, predicted pictures, and interpolated pictures.

However, in accordance with the invention, the scene cut control signal is used to ensure that after each scene-cut, a new GOP is begun. The beginning of each GOP is a random access point, which may be decoded without reference to any previously decoded pictures.

The scene-cut control signal also determines what type of MPEG pictures will be encoded within each GOP. The first frame after the scene-cut is a intrapicture (I) frame. Thus, no motion estimation is attempted over the scene-cut boundary. The last frame of the scene is a reference picture, which means that it must be either an I picture or a predicted (P) picture. Predicted pictures are coded with reference to a past picture (I or P) are used as a reference for future predicted pictures. The in between frames within the scene include bidirectional (B) pictures, which provide high compression but require both a past and a future reference picture for prediction. These in between pictures may also include I pictures and P pictures, especially if the scene is longer than a predetermined number of frames, typically 6– 8 frames or ⅓ second.

Figure 4:
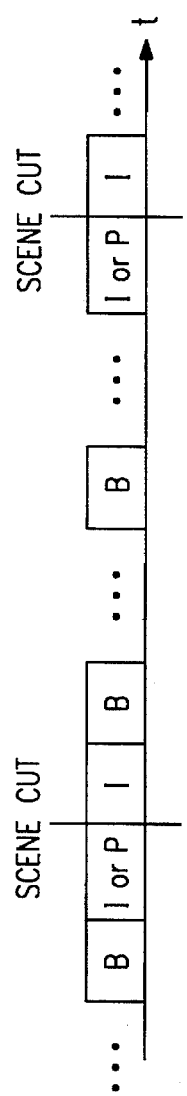
FIG. 4 illustrates how MPEG pictures are arranged before and after a scene cut, prior to transmission.

FIG. 4 illustrates the sequence within each frame, of the first frame, last frame, and in between frames. As illustrated, the first picture is an intrapicture. The last picture is either an intrapicture or a predicted picture. The pictures in between are bidirectional pictures, but could also be intrapictures or predicted pictures. In the arrangement of FIG. 4, the pictures correspond to the order of the source data, but will be rearranged for transmission in accordance with MPEG standards.

Once the arrangement of pictures (I, B, or P) to be encoded is determined, the encoding is performed in accordance with MPEG techniques. These techniques are described in an article by Le Gall, "MPEG: A Video Compression Standard for Multimedia Applications", *Communications of the ACM*, April 1991, Vol. 34, No. 4, pp 47–58. The MPEG publication is ISO/IEC/13818-2, "Coding of Moving Pictures and Associated Audio".

Figure 5:
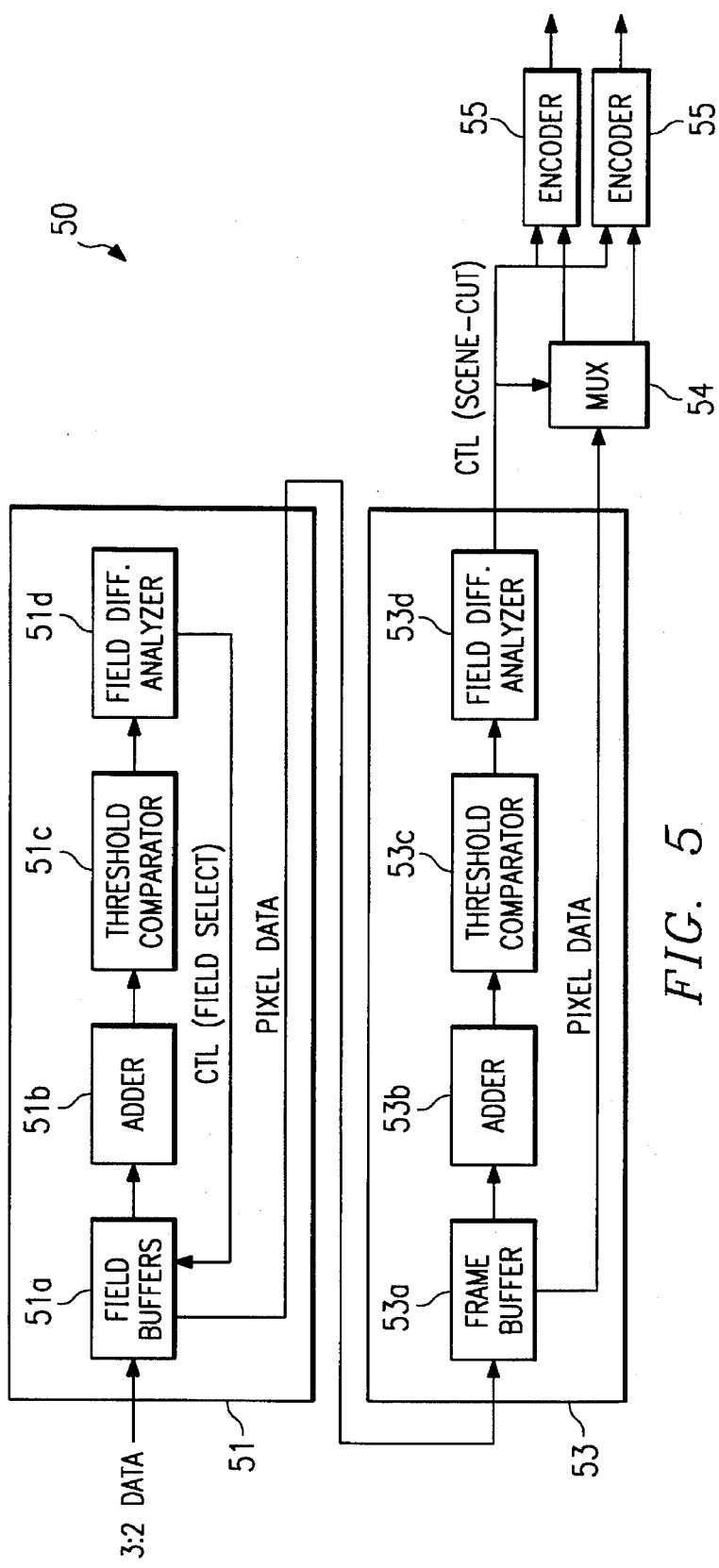
FIG. 5 is a functional block diagram of a processor system, programmed in accordance with the invention.

FIG. 5 illustrates a processor system 50, programmed to encode 3:2 data in accordance with the invention. In FIG. 5, processor system 50 has a number of subprocessor systems 51, 53, 55. Apart from the memory components (field buffers 51a and frame buffers 53a), each subprocessor system 51, 53, 55 can be implemented entirely with software or may be implemented with equivalent logic circuitry for performing one or more tasks. For example, the reverse pulldown process could be entirely performed with programming executed by a processor, or as illustrated, could incorporated an adder and comparator. Furthermore, it is possible that all tasks other than those of the buffers 51a, 53a could be implemented with a single processor.

A reverse pulldown process 51 converts the data from film format to progressive format, consistent with step 21 of FIG. 2. Field buffers 51a store fields of data, whose pixel values are currently being compared. An adder 51b calculates pixel difference values and a field difference value, which is compared to a threshold by comparator 51c. The field difference values are analyzed by a field difference analyzer 51d to detect the pulldown pattern, such as the 3:2 pattern discussed above. It delivers a control signal to the field buffers 51a so that the proper fields may be retained and re-combined to make progressive frames.

A scene cut detection process 53 detects scene cuts in consistent with step 22 of FIG. 2. It includes frame buffers 53a, which receive and combine fields of data in the correct order from field buffers 51a as determined by the control signal from analyzer 51d. The data in frame buffers 51a may be output as progressive frames. An adder 53b determines frame difference values, which are compared to a threshold by a comparator 53c. The frame difference values are analyzed by a frame difference analyzer 53d to distinguish scene cuts from other scene changes, such as motion.

One or more encoders 55 encode the data consistent with step 23 of FIG. 2. An advantage of separating the data into scenes is that subsequent encoding can be performed in parallel. Each scene can be separately encoded, resulting in faster throughput. Thus, the scene cut control signal may be delivered to a multiplexer 54, which delivers parallel streams of data to different encoders 55.

As a result of the method described above, more bits are allowed per frame. A 1.5 Mbit per second rate for 30 frames per second allows an average of 50 kbits per frame. However, a 1.5 Mbit per second rate for 24 frames per second allows an average of 62.5 Kbits per frame.

Another result of the method is that bits are not wasted on high frequency quantization caused by time-separated fields. Fields sampled at different times result in serrated edges, which require higher bit rates to encode for a given quality level.

A third result of the method is that GOPs do not traverse scene-cuts. This improves computational performance during encoding. If the MPEG motion estimation function were performed across scene cuts, the worst case searches would occur.

A fourth result of the method is that the resulting MPEG bitstream is conveniently segmented by scene content. This benefits post-production processing, such as editing, random accessing by content, or assembling movie picture boards.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of encoding video display data, after that data has been previously converted from a film frame rate to a faster video frame rate, comprising the steps of:

re-converting the data to the film frame rate, thereby obtaining progressive frame data;

detecting when scene cuts occur in said progressive frame data; and encoding said progressive frame data, such that each scene cut begins a new group-of-pictures (GOP) and each new GOP has an intrapicture as the first picture.

2. The method of claim 1, wherein said video display data has been previously converted by repeating fields, and wherein said re-converting step is performed by detecting a pattern of repeated fields.

3. The method of claim 2, wherein said pattern of repeated fields are detected by calculating field difference values.

4. The method of claim 1, wherein said video display data has been previously converted using a 3:2 pulldown process, and wherein said re-converting step is performed by detecting the 3:2 pulldown pattern.

5. The method of claim 1, wherein said detecting step is performed by calculating frame difference values in said progressive frame data.

6. The method of claim 1, wherein said detecting step is further performed by analyzing a series of frame difference values to distinguish motion from scene cuts.

7. The method of claim 6, wherein said frame difference values are spatial domain values.

8. The method of claim 6, wherein said frame difference values are frequency domain values.

9. The method of claim 1, wherein said encoding step is performed such that the last picture of each GOP is either an intrapicture or an interpolated picture.

10. The method of claim 9, wherein said encoding steps is performed such that pictures within each GOP, except said first picture or said last picture, include interpolated pictures.

11. The method of claim 1, wherein said encoding step is performed in parallel for a number of GOPs.

12. A processor for encoding video display data, after that data has been previously converted from a film frame rate to a faster video frame rate, comprising:

a reverse pulldown processor for re-converting the data to the slower film frame rate, thereby obtaining progressive frame data;

a scene cut detector for detecting when scene cuts occur in said progressive frame data; and an encoder for encoding said progressive frame data, such that each scene cut begins a new group-of-pictures (GOP) and each new GOP has an intrapicture as the first picture.

13. The method of claim 12, wherein said video display data has been previously converted by repeating fields, and wherein said reverse pulldown processor detects a pattern of repeated fields.

14. The method of claim 13, wherein said reverse pulldown processor calculates field difference values.

15. The method of claim 12, wherein said video display data has been previously converted using a 3:2 pulldown process, and wherein said reverse pulldown processor detects the 3:2 pulldown pattern.

16. The method of claim 12, wherein said scene cut detector calculates frame difference values in said progressive frame data.

17. The method of claim 12, wherein said scene cut detector analyzes a series of frame difference values to distinguish motion from scene cuts.

18. The method of claim 12, wherein said encoder encodes the last picture of each GOP as either an intrapicture or an interpolated picture.

19. The method of claim 18, wherein said encoder encodes pictures within each GOP, except said first picture or said last picture, as interpolated pictures.

20. The method of claim 12, wherein said processor has a number of encoders for encoding different scenes in parallel.

* * * * *